April 4, 1961  J. W. HAWKINS  2,977,916
TOOL FOR ALIGNING PIPE AND PIPE FITTINGS
Filed March 26, 1958                               2 Sheets-Sheet 1
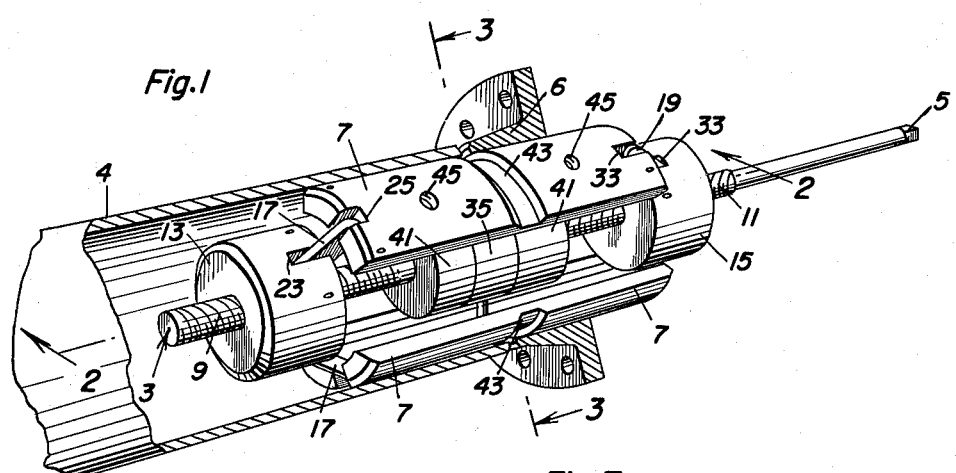
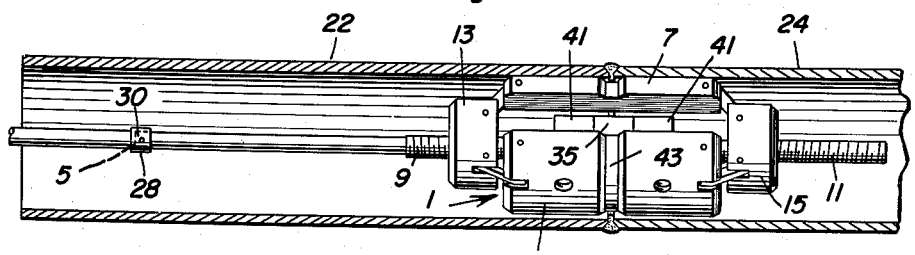
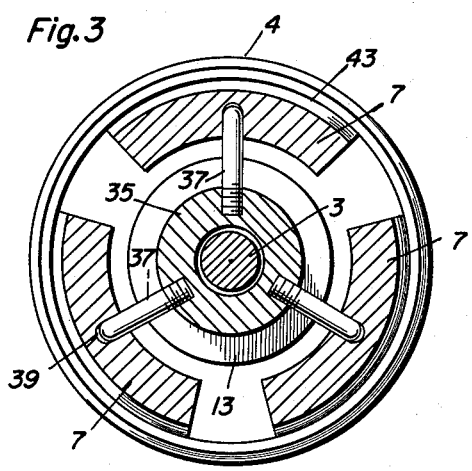
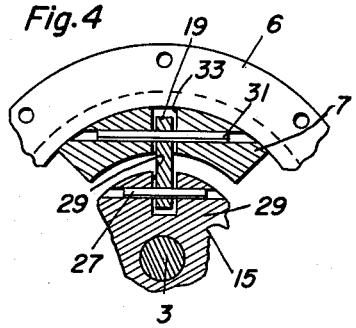
Jacob W. Hawkins
INVENTOR.
BY *Clarence A. O'Brien*
and *Harvey B. Jacobson*
Attorneys April 4, 1961 J. W. HAWKINS 2,977,916
TOOL FOR ALIGNING PIPE AND PIPE FITTINGS
Filed March 26, 1958 2 Sheets-Sheet 2
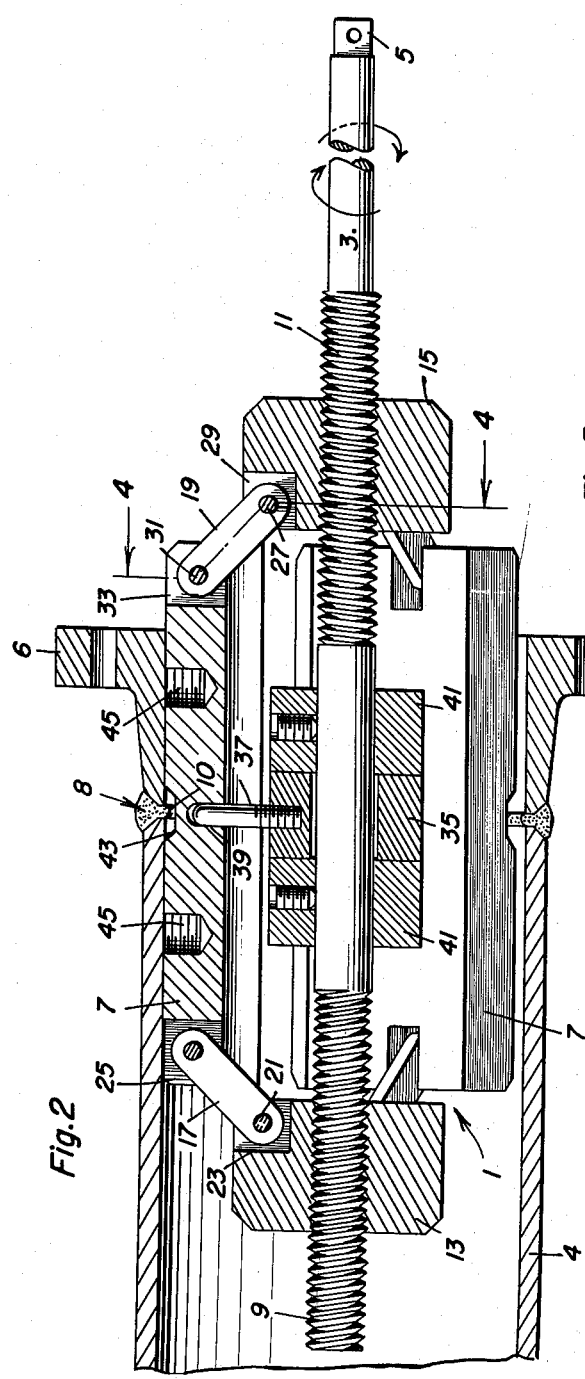
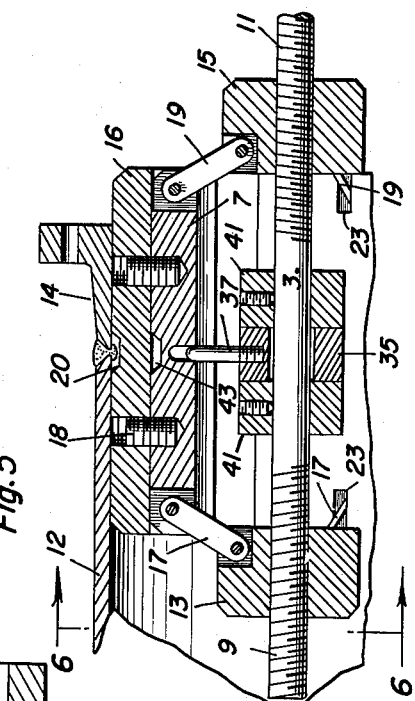
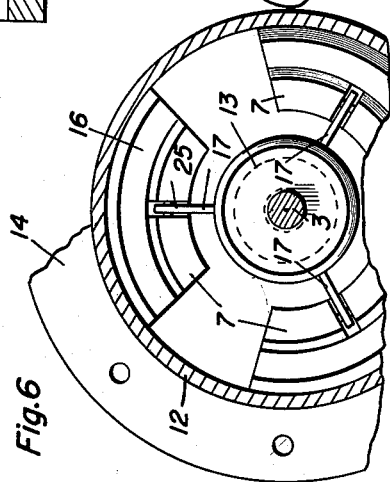
Jacob W. Hawkins
INVENTOR.

United States Patent Office 2,977,916
Patented Apr. 4, 1961

2,977,916

TOOL FOR ALIGNING PIPE AND PIPE FITTINGS

Jacob W. Hawkins, Rte. 2, Box 157, Pueblo, Colo.

Filed Mar. 26, 1958, Ser. No. 724,067

4 Claims. (Cl. 113—102)

This invention relates to improvements in tools for aligning pipe and pipe fittings in butt joint relation while welding the joint together.

The primary object of this invention is to provide an easily operated expansible clamping tool for use internally in pipe and pipe fittings to hold the same together in butt joint relation and accurate alignment preparatory to and while the joint is being welded and which will not interfere with the usual stringer bead formed internally in the pipe and fittings during welding.

Another object is to provide a tool for the above purposes which is adapted for use in different sizes of pipe and pipe fittings and which is of simple construction, not liable to get out of order and inexpensive to manufacture and durable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view, partly broken away, and shown in section, of this improved tool in a pipe and pipe fitting of one size;

Figure 2 is a fragmentary enlarged view in longitudinal section, partly broken away and taken on the line 2—2 of Figure 1;

Figure 3 is an enlarged view in cross-section taken on the line 3—3 of Figure 1;

Figure 4 is a fragmentary view in cross-section taken on the line 4—4 of Figure 2, and drawn to a smaller scale;

Figure 5 is an enlarged fragmentary view in longitudinal section illustrating the use of a tool in pipe of a larger size;

Figure 6 is a fragmentary view in cross-section taken on the line 6—6 of Figure 5; and Figure 7 is a fragmentary view partly in side elevation and partly in longitudinal section illustrating the use of the improved tool for aligning pipe sections in a pipe line, and drawn to a smaller scale.

Referring to the drawings by numerals and first to Figures 1 to 4, the tool 1 of this invention comprises a rotary operating shaft 3 of any suitable length provided with a flattened, apertured front end 5 for attachment of a wrench, or chuck, not shown, thereto for rotating the shaft, and also for another purpose presently described.

A plurality of elongated transversely arcuate shoes 7 are grouped around the shaft intermediate its ends in 120° angular relation for operation outwardly and inwardly in pipe and pipe fittings to engage and disengage the inner circumferential surface thereof with a gripping action.

The operating shaft 3 is operatively connected to the shoes 7 to move the same by means of the following. A pair of right and left hand threaded sections 9, 11 are provided on the shaft 3 in longitudinally spaced relation.

A pair of annular collars 13, 15 are threaded onto the sections 9, 11 respectively, for screw feed toward and away from each other. Two series of toggle links 17, 19 extend radially outwardly from the collars 13, 15 respectively, to the shoes with the links in each series converging outwardly toward those in the other series. The links 17 of one series are terminally pivoted at inner ends thereof, as at 21, in notches 23 in the collar 13 and at their outer ends in notches 25 in one end of the shoes 7, and the links 19 of the other series are similarly pivoted, as at 27, in notches 29 in the other collar 15, and as at 31, in notches 33 in the other ends of the shoes 7.

Guide and centering means is provided for maintaining the shoes 7 parallel to the axis of the shaft 3. This means comprises a collar 35 loose on the shaft 3 in the space between the threaded sections 9, 11 having radial pins 37 threaded therein and slidably fitting in sockets 39 in the inner sides of the shoes 7.

The collar 35 is adjustable longitudinally of the shaft 3 to adjust the shoes 7 parallel with the axis of said shaft 3. Set collars 41 on said shaft 3 at opposite sides of the collar 35 retain the collar 35 in adjusted position. Transverse central grooves 43 are provided in the outer sides of the shoes 7 to accommodate an internal annular welding bead of a welded joint between pipe and pipe fittings in a manner presently described.

A pair of threaded sockets 45 are provided in the outer sides and longitudinal centers of the shoes 7 at opposite sides of the transverse centers of the shoes 7 for a purpose presently described.

Referring now to the operation of the tool described in the foregoing and which, as will be understood, is designed for use with pipe and fittings of a limited range of sizes in diameter. As will be obvious, rotation of the shaft 3 counterclockwise, as indicated by the dotted line arrow in Figure 2, will screw feed the collars 13, 15 on said shaft 3 away from each other to cause the outer ends of the toggle links 17, 19 to swing on their pivots 21, 27 on the collars 13, 15 toward the axis of the shaft 3 to move the shoes 7 towards said shaft and thus contract the tool, whereas, rotation of the shaft clockwise, as indicated by the full line arrow in Figure 2, will feed the collars 13, 15 toward each other to cause the outer ends of the toggle links 17, 19 to swing outwardly of the shaft 3 and thereby expand the tool. With the tool 1 contracted to fit loosely in a given size of pipe 4 and pipe fitting 6 and the pipe and fitting shoved together in butt joint relation with the joint centered over the groves 43, as shown in Figure 1, the tool is then expanded to cause the shoes to grip and axially align the pipe 4 at opposite sides of the joint and pipe fitting 6 after which the joint may be welded as at 8, and the stringer bead 10 will be accommodated in the grooves 43, while the pipe and fitting are gripped at opposite sides of the joint.

Referring to Figures 4 and 6, for aligning larger sizes of pipe, as at 12, and fittings, as at 14, transversely arcuate shims 16 are provided to conformably fit on the outer sides of the shoes 7 and are secured thereto by screws 18 turned into the sockets 45 in said shoes 7. The shims 16 are provided with transverse central grooves 20 in the outer sides thereof like the grooves 43 and for the same purpose.

Referring now to Figure 7, in the case of aligning pipe, as at 22, 24 in a pipe line for butt joint welding and use in such pipe in the same manner as described in connection with the pipe 4 and pipe fitting 6, an auxiliary operating shaft 26 is secured by a terminal socket 28 and a pin 30 to the end 5 of the operating shaft 3 to extend out of a pipe, for instance 22, to facilitate insertion of the tool 1 and rotation of the operating shaft 3.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tool for aligning pipe and pipe fitting and holding the same in butt joint relation for welding of the joint comprising an operating rotary shaft insertible in a pipe and pipe fitting of the same internal diameters, a plurality of elongated transversely arcuate shoes grouped around said shaft to extend longitudinally thereof, means operatively connecting said shaft to said shoes to move the same outwardly of the shaft to grip a pipe and pipe fitting internally at opposite sides of the joint comprising a pair of right and left hand screw thread sections on said shaft spaced apart thereon, a pair of annular collars threaded on said screw thread sections and movable toward each other in response to rotation of said shaft in one direction, means pivotally connected to said collars and to said shoes to move the shoes outwardly in response to movement of said collars toward each other, a shoe adjusting collar on said shaft having radial pins threaded therein slidable in sockets in said shoes and being longitudinally adjustable on said shaft between said threaded sections for adjusting the shoes parallel with the axis of said shaft, and a pair of set collars on said shaft at opposite sides of said adjusting collar for locking said adjusting collar in adjusted position.

2. A tool for aligning pipe and pipe fitting and holding the same in butt joint relation for welding comprising a rotary shaft insertable in a pipe and pipe fitting of the same diameter, a plurality of shoes grouped around said shaft, screw feed means operatively connecting said shaft to said shoes to move said shoes outwardly to grip a pipe and pipe fitting internally at opposite sides of the joint therebetween in response to rotation of said shaft, a shoe adjusting collar on said shaft having radial pins therein slidable in sockets in said shoes and including means for longitudinally adjusting the adjusting collar on said shaft for adjusting the shoes parallel with the axis of the shaft.

3. A tool according to claim 2, said pins being cylindrical to obviate binding in said sockets.

4. A tool for aligning pipe and pipe fitting and holding the same in butt joint relation for welding comprising a rotary shaft insertable in a pipe and pipe fitting of the same diameter, a plurality of elongated transversely arcuate shoes grouped around said shaft to extend longitudinally thereof, screw feed means operatively connecting said shaft to said shoes to move the shoes outwardly to grip a pipe and pipe fitting internally at opposite sides of a joint therebetween in response to rotation of said shaft including a pair of longitudinally spaced apart oppositely threaded sections on said shaft, a shoe adjusting collar on said shaft having radial pins threaded therein slidable in sockets in said shoes and being longitudinally adjustable on said shaft between said threaded sections for adjusting the shoes parallel with the axis of said shaft, and a pair of set collars on said shaft at opposite sides of said adjusting collar for locking said adjusting collar in adjusted position.

References Cited in the file of this patent

UNITED STATES PATENTS

| 895,298 | Pope | Aug. 4, 1908 |
| 2,323,039 | Hill | June 29, 1943 |
| 2,460,325 | Whitson et al. | Feb. 1, 1949 |
| 2,691,952 | Wilson et al. | Oct. 19, 1954 |
| 2,821,946 | Goekler | Feb. 4, 1958 |

FOREIGN PATENTS

| 207,010 | Canada | Dec. 28, 1920 |